United States Patent [19]

Drake et al.

[11] 4,278,375
[45] Jul. 14, 1981

[54] TRAILER

[76] Inventors: Jerry D. Drake, Rte. 4, Box 345A, Sullivan, Ind. 47882; Thomas L. Drake, Rte. 2, Shelburn, Ind. 47879

[21] Appl. No.: 130,000

[22] Filed: Mar. 13, 1980

[51] Int. Cl.³ .............................................. B60P 3/06
[52] U.S. Cl. ...................................... 410/26; 410/24; 414/483
[58] Field of Search .................... 280/789; 410/4, 6, 7, 410/13, 14, 15, 16, 17, 18, 24, 26, 29; 414/481, 482, 483

[56] References Cited

U.S. PATENT DOCUMENTS

| | | | |
|---|---|---|---|
| 2,131,949 | 10/1938 | Helmig | 414/481 |
| 3,449,010 | 6/1969 | Hoy | 410/26 |
| 3,690,717 | 9/1972 | Taylor | 414/481 |

FOREIGN PATENT DOCUMENTS 473690  3/1929  Fed. Rep. of Germany .

Primary Examiner—Joseph F. Peters, Jr.
Assistant Examiner—Ross Weaver
Attorney, Agent, or Firm—Woodard, Weikart, Emhardt & Naughton

[57] ABSTRACT

A vehicle transport trailer, which is capable of carrying three to four vehicles and can be hauled by a pick-up truck. The trailer has two levels. The upper level has a rear end portion which is sloped towards the ground and is used as a ramp for loading and unloading. A hitch is attached to the front end of the upper level. A lower level is hinged to the main body of the trailer and is attached to the front end of the upper level by power activated telescoping members which are movable between a first position in which the trailer can be hauled at its hitch by a pick-up truck, and a second extended position in which the trailer is supported by the front end of the lower level and the rear end of the upper level, with the front end of the upper level and the hitch being pivoted upwardly to allow free access for loading and unloading of the lower level.

4 Claims, 4 Drawing Figures

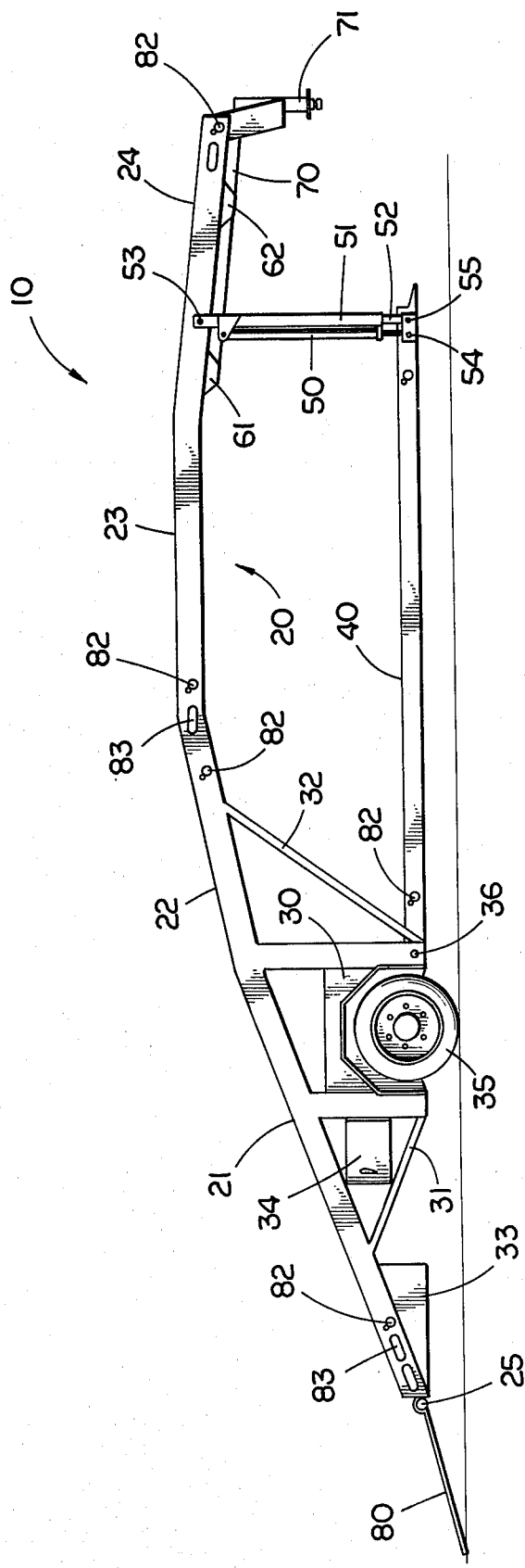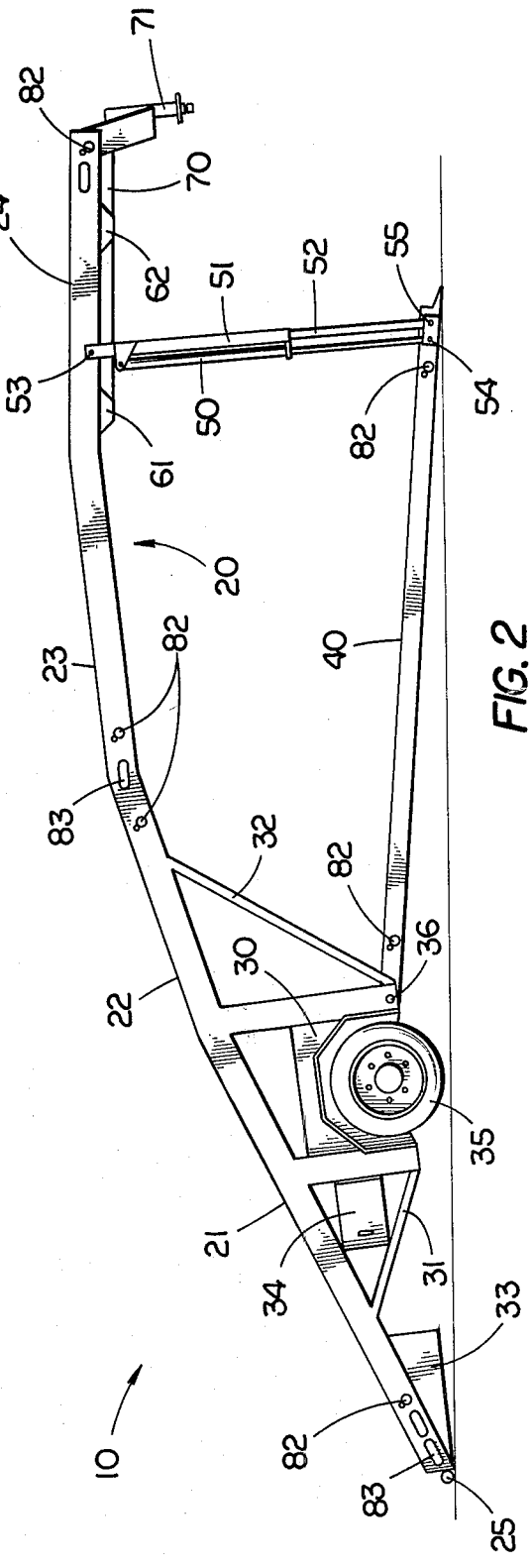

TRAILER

BACKGROUND OF THE INVENTION

1. Field of the Invention

The field of the invention is trailers, more particularly the field of the invention is trailers which are useful for the transportation of vehicles.

2. Description of the Prior Art

It is desirable that vehicle transport trailers be so designed so as to carry the vehicles to be transported efficiently.

U.S. Pat. No. 3,589,767 to Stewart discloses a vehicle transport system which can carry up to seven vehicles. The system includes ramps at various levels which are movable between positions for loading and unloading of the vehicles to be transported to accomplish and efficient loading arrangement, and also includes two ramps which are positioned over the cab.

U.S. Pat. No. 3,690,717 also discloses a seven vehicle transport system and incorporates ramps which are movable between different relative positions for loading and unloading.

It is also desirable for a trailer to be easily loaded and unloaded. U.S. Pat. No. 3,424,489 to Hoy discloses a trailer which has an adjustable upper level for ease in loading and unloading.

For frontloading trailers, the hitch can oftentimes be a hindrance during loading and unloading. U.S. Pat. No. 2,131,949 to Helmig and German Patentschrift No. 473,690 disclose two trailers which incorporate means for moving the hitch out of the way to accomplish loading and unloading at the front end of the trailer.

SUMMARY OF THE INVENTION

In general terms, the present invention relates to trailers which can efficiently transport a given number of vehicles, and which are also convenient to use in the loading and unloading of these vehicles and in the attachment and detachment with a towing vehicle.

In one embodiment of the present invention, a bi-level trailer has a capacity of three to four vehicles and can be hauled by a pick-up truck. The upper level has a rear end portion which is sloped towards the ground and is used as a ramp for loading and unloading as well as for hauling. A hitch is attached to the front end of the upper level. A lower level is hinged to the main body of the trailer, and is attached to the front end of the upper level by telescoping members which are power activated. These telescoping members are movable between a first position in which the trailer can be hauled at its hitch by a pick-up truck, and a second, extended position in which the trailer is supported by the front end of the lower level and the rear end of the upper level, with the front end of the upper level and the hitch being pivoted upwardly to allow free access for loading and unloading of the lower level. The same pivoting action provides a means for disconnecting and attaching the hitch to a transporting vehicle without manual effort.

It is an object of the present invention to provide a trailer that can efficiently transport a given number of vehicles.

It is a further object to provide such a trailer that can be conveniently loaded and unloaded, and can be conveniently attached to and detached from a transporting vehicle.

These and other objects and advantages will become apparent from the following description.

BRIEF DESCRIPTION OF THE DRAWINGS

FIG. 1 is a side elevational view of a trailer according to the present invention, with the trailer being in a traveling position (except for ramp 80 being connected to the rear of the trailer).

FIG. 2 is a side elevational view of the trailer of FIG. 1 with the trailer being in a front loading position.

DESCRIPTION OF THE PREFERRED EMBODIMENT

Figure 3:
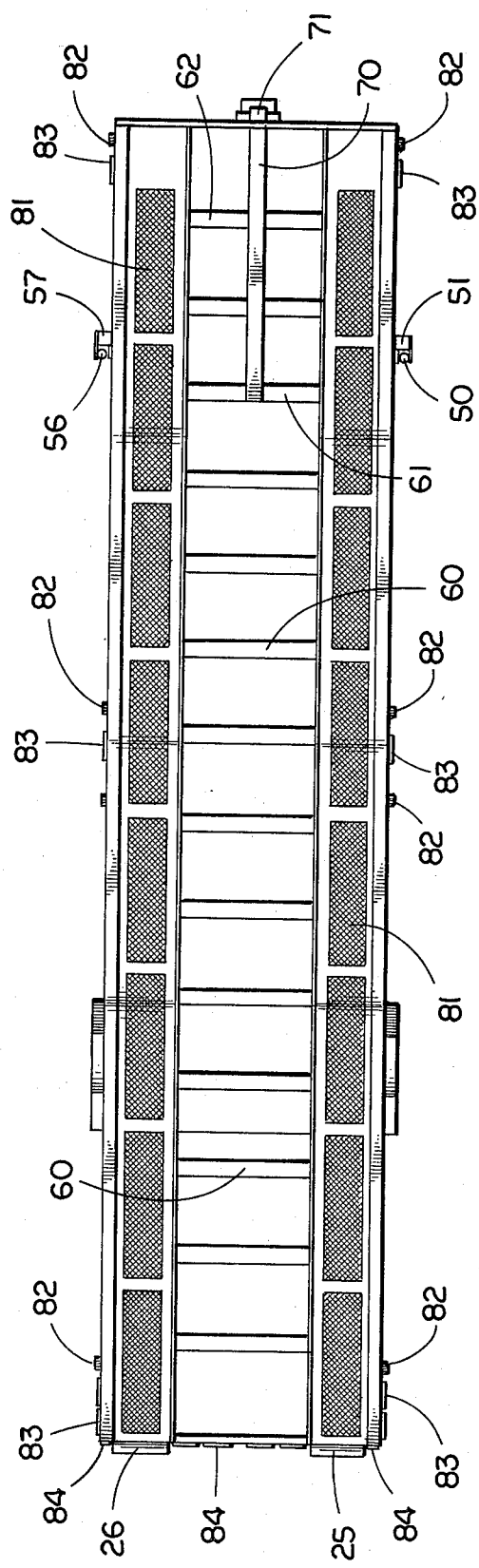
FIG. 3 is a top, plan view of the trailer of FIGS. 1 and 2.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, FIG. 1 illustrates a single axle trailer 10, the trailer having two carrying levels 20 and 40. The upper level, or track, 20 has a generally bowed shape when viewed from the side. This generally bowed shape, or arc, is formed by four track portions. The rear end portion 21 extends downwardly towards the rear of trailer 10, as a ramp. Track portion 22 extends downwardly at slightly less of an angle as portion 21. The next track portion, portion 23, is approximately horizontal. The front end portion 24 extends slightly downwardly as it extends towards the front of trailer 10.

Upper track 20 is supported by the main body portion 30 of trailer 10 at rear end portion 21 and portion 22. Braces 31 and 32 provide additional support. Hitch 71 is attached to the front end portion 24 of upper track 20. In FIG. 3, the manner of attachment of hitch 71 can be more clearly seen. Hitch 71 attaches to a tow bar 70 which is, in turn, attached to main cross bars 61 and 62. In the preferred embodiment, the hitch apparatus used is a Holland Kingpin hitch. In certain embodiments hitch 71 may be adjustable in height to allow for attachment to various trucks which may have hitching apparatus positioned at different heights.

Lower track 40 is pivotally attached to the main body portion 30 by hinge 36. The front end of lower track 40 is attached to the front end portion 24 of upper track 20 by hydraulic cylinder 50 and by telescoping members 51 and 52. Hydraulic cylinder 50 is pivotally attached to lower track 40 by hinge 54. Telescoping members 51 and 52 are mounted to hydraulic cylinder 50 and are pivotally attached to upper track 20 and lower track 40 by hinges 53 and 55 respectively. The hydraulic cylinder 50 should preferably be of the double acting power-up power-down type.

It should be noted trailer 10 has portions on the left side which correspond to those portions which are illustrated on the right side of the trailer. These portions of trailer 10 are not illustrated in the figures (except for hydraulic cylinder 56 and telescoping member 57 which are partially seen in FIG. 3), however they do have the same structures and functions as their corresponding portions on the right side of trailer 10 which are illustrated.

FIG. 1 illustrates trailer 10 in a traveling position (with the exception that ramp 80 must be removed before trailer 10 may actually be hauled). FIG. 2 illustrates trailer 10 in a front loading position, in which hydraulic cylinders 50 and 56 have been moved to an extended position. This extension of hydraulic cylinders 50 and 56 places the weight of trailer 10 upon the rear end portion 21 of upper track 20 and the front end of lower track 40, with wheel assembly 35 being raised above the ground. In the extended position, the front end portions 23 and 24 of upper track 20 and hitch 71 have been pivoted upwardly to allow free access for loading and unloading onto and off of lower track 40. Hinges 53, 54 and 55 allow relative pivotal movement between lower track 40 and upper track 20 as hydraulic cylinder 50 is moved between contracted and extended positions. By extending hydraulic cylinders 50 and 56 into this extended position, trailer 10 can also be removed from a towing vehicle without manual effort.

The wheel assembly in the preferred embodiment includes a Dexter 10,000 pound axle. Other axles having a load bearing capacity of 10,000 pounds or more would be sufficient for embodiments of the present invention which are designed to carry three to four vehicles.

Portable ramp 80 attaches to bar 25 which is located at the rear of trailer 10. A portable ramp identical to ramp 80 also attaches to bar 26 which is at the rear of the left hand portion of trailer 10. The length of ramp 80 and its corresponding ramp for the left side of the trailer is approximately four feet in the preferred embodiment, however, this length may vary depending upon the particular specific design of a trailer according to the present invention. The purpose of these ramps is to provide ease of access for loading and unloading onto upper track 20. When these ramps are not in use, they can be easily stored in storage box 33.

The loading and unloading of upper track 20 is performed at a time when trailer 10 is connected to a transporting vehicle by hitch 71. This is when hydraulic cylinders 50 and 56 are in a contracted position (FIG. 1). This is done with the aid of portable ramp 80 and its corresponding ramp for the left side of the trailer. When portable ramp 80 (and its corresponding ramp) are removed, trailer 10 is then ready to be transported. Lower track 40 is loaded and unloaded when trailer 10 is disconnected from a transporting vehicle, with hydraulic cylinders 50 and 56 being power activated to an extended position (FIG. 2).

Figure 4:
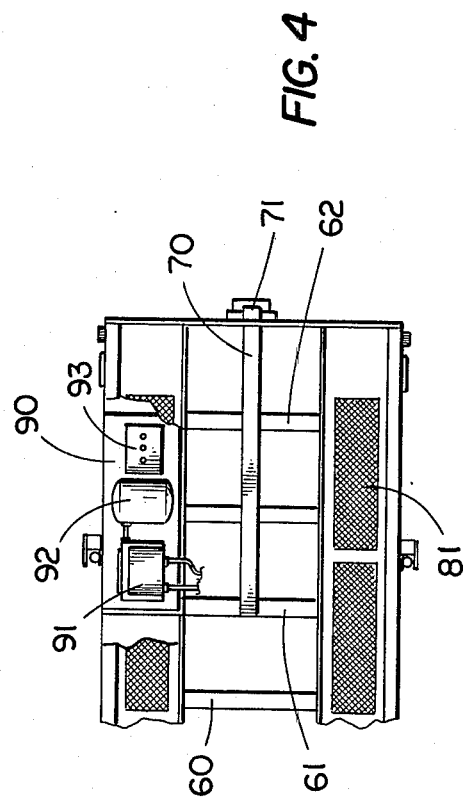
FIG. 4 is a partial fragmentary top plan view of the trailer of FIGS. 1, 2 and 3.

In FIGS. 3 and 4, it can be seen that the track areas of trailer 10 have sheets of expanded metal 81. Sheets 81 provide additional traction for the vehicles to be transported. Alternatively, the track areas may be perforated to provide the desired traction. Tie downs 82 are at various locations along the side of the track portions of trailer 10. Tie downs 82 are attachable to chains or other lines, and utilize a ratchet action to apply tension, thereby holding down vehicles to be transported. The chains, or lines, and the tools which may be used in the operation of the trailer can easily be stored in storage box 34. Side reflector lights 83 and back up lights 84 are also illustrated at various locations on trailer 10.

Hydraulic cylinders 50 and 57 are powered by hydraulic motor 91 which is located on ledge 90 beneath the front end portion 24 of upper track 20. Also on ledge 90 is located a reservoir pump 92 for hydraulic motor 91 and battery 93.

FIGS. 3 and 4 also illustrate a number of cross sills 60 which add to the structural stability of trailer 10.

The above described preferred embodiment of the present invention is highly material efficient. An extremely high proportion of the material of the constructed trailer serves a load bearing function for the vehicles to be transported. Trailer 10 is a compact trailer which, although small in size, can still haul three full sized automobiles, and up to four compact automobiles (three vehicles on the upper level and one vehicle on the lower level). The trailer can be hauled by a pickup truck or other small truck. The trailer can be easily loaded and unloaded, and can be easily disconnected from a towing vehicle without manual effort.

It has been found that the above described preferred embodiment is particularly useful for towing a small number of vehicles efficiently, and as such is quite suitable for use by used car dealerships.

It should be noted that the principles of the above described preferred embodiment can be effectively incorporated in larger, multiaxle trailers and still fall within the spirit of the invention. Further, other specific variations of the particular embodiment for a single axle trailer which has been described may also be within the spirit of the invention. Therefore, while there have been described above the principles of this invention in connection with specific apparatus it is to be clearly understood that this description is made only by way of example and not as a limitation to the scope of the invention.

What is claimed is:

1. A trailer useful for transporting vehicles, said trailer comprising:
   (a) an upper track and a lower track, said upper track having a rear end ramp portion which is downwardly extending toward the ground;
   (b) hitch means for connecting said trailer to a transporting vehicle, said hitch means being attached to the front end portion of said upper track and extending downwardly therefrom;
   (c) a central body portion, including a wheel assembly;
   (d) said lower track being pivotally connected to said central body portion at the rear of said lower track; and
   (e) power actuated telescoping means for connecting the front end portion of said lower track with said upper track, said means being extensible between a first position in which said trailer can be towed at said hitch with said trailer riding on said wheel assembly, and a second, extended position in which said trailer is supported by the front end of said lower track and the rear end of said upper track, and in which said said upper track is pivoted upwardly, allowing free access to said lower track for loading onto and unloading off of said lower track.

2. A trailer, said trailer comprising:
   (a) an upper track and a lower track, said upper track having a rear end ramp portion which is downwardly extending toward the ground;
   (b) hitch means for connecting said trailer to a transporting vehicle, said hitch means being attached to the front end portion of said upper track and extending downwardly therefrom;
   (c) a central body portion, including a wheel assembly;

(d) said lower track being pivotally connected to said central body portion at the rear of said lower track; and (e) connecting means for connecting the front end portion of said lower track with said upper track, said connecting means including power actuated telescoping means for adjusting the distance between said front end portion of said lower track and said upper track, said power actuated telescoping means being extensible between
 1. a first position in which said trailer can be towed at said hitch with said trailer riding on said wheel assembly, and
 2. a second, extended position in which the front end of said lower track is pivoted to the ground, and said upper track and said hitch are pivoted upwardly, allowing free access to said lower track for loading onto and unloading off of said lower track and removing said hitch from a transporting vehicle without manual effort.

3. A trailer, said trailer comprising:
(a) an upper track and a lower track;
(b) hitch means for connecting said trailer to a transporting vehicle, said hitch means being attached to the front end portion of said upper track and extending downwardly therefrom;
(c) a central body portion, including a wheel assembly;
(d) said lower track being connected to said central body portion at the rear of said lower track;
(e) hinge means for allowing relative pivotal movement between said lower track and portions of said upper track; and (f) connecting means for connecting the front end portion of said lower track with said upper track, said connecting means including power actuated telescoping means for adjusting the distance between the front end portion of said lower track and said upper track, said power actuated telescoping means being extensible between
 1. a first position in which said trailer can be towed at said hitch with said trailer riding on said wheel assembly, and
 2. a second position in which said upper track and said hitch are pivoted relatively away from said lower track, allowing free access to said lower track for loading onto and unloading off of said lower track and simultaneously removing said hitch from a transporting vehicle without manual effort.

4. A trailer, said trailer comprising an upper level and a lower level; hitch means for connecting said trailer to a transporting vehicle, said hitch means being attached to the front end portion of said upper level and extending downwardly therefrom; hinge means for allowing relative pivotal movement between said lower level and portions of said upper level; and means for preparing said trailer for front loading and unloading of said lower level and for simultaneously removing said hitch means from a transporting vehicle, said preparing means including power actuated telescoping means for adjusting the distance between the front end portion of said lower track and said upper track, said power actuated telescoping means being extensible to a position in which the front end of said lower track is pivoted to the ground and the front end of said upper track and said hitch are pivoted upwardly away from said lower track.

* * * * *